Sept. 24, 1929.  G. W. BOST  1,729,500
MEANS FOR INDICATING QUANTITIES REQUIRED FOR THE
CORRECT OPERATION OF CONTINUOUS PROCESSES
Filed Oct. 15, 1928
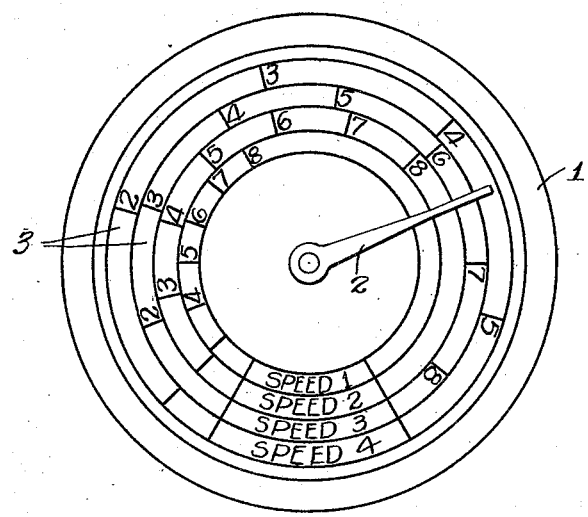
Fig. 1.
Fig. 2.
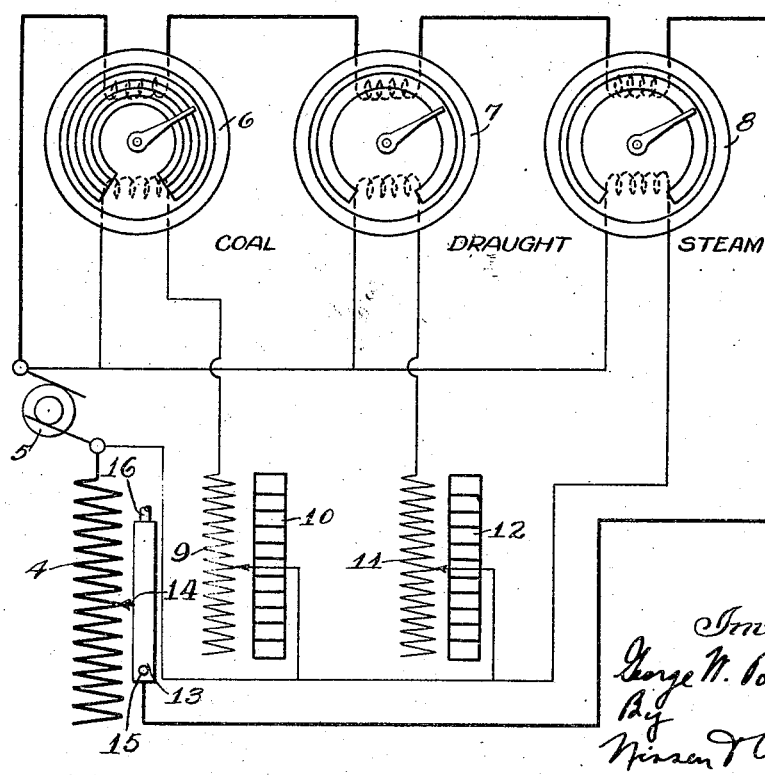

Patented Sept. 24, 1929

1,729,500

UNITED STATES PATENT OFFICE

GEORGE WILLIAM BOST, OF HILLINGDON, ENGLAND, ASSIGNOR TO REPUBLIC FLOW METERS CO., OF CHICAGO, ILLINOIS, A CORPORATION OF ILLINOIS

MEANS FOR INDICATING QUANTITIES REQUIRED FOR THE CORRECT OPERATION OF CONTINUOUS PROCESSES

Application filed October 15, 1928, Serial No. 312,708, and in Great Britain August 29, 1927.

The object of this invention is to provide means whereby an operator controlling the continuous input of quantities of fuel, air or other substance to a combustion process, chemical process, or the like may be informed of the rate at which such quantities should be fed to the process. In many processes there is a proportionality between the rate of input or output of one particular quantity to or by the process and the rate at which another quantity must be supplied in order to maintain the correct conditions of operation. In a great number of cases, a quantity, not directly under the control of the operator, and which may be termed an independently variable or controlling quantity, determines the rate at which the entire process shall proceed. Thus, in the case of a steam boiler, the steam output constitutes such an independently variable quantity, and fuel and air must be supplied at a rate predetermined by the steam output. While the variations in the boiler pressure indicate departures from the correct relationship between steam output and fuel quantities input, it is evident that control effected from observations of a pressure gauge alone is not conducive to efficient operation, as it is only after a departure from the correct relationship of output and input quantities has occurred that the operator is made aware that a change in his input quantities is required, and, further, boiler control effected solely with a view to maintaining the correct boiler pressure does not insure that the boiler is operating at conditions of high efficiency.

According to the present invention a pointer, index, or the like, actuated according to the value of an independently variable input or output quantity registers with a scale calibrated in terms of some other quantity or quantities required for the correct operation of the process. An additional calibration may also be made of the independently variable quantity itself. Alternatively a plurality of indicators may be provided, each having a pointer actuated according to the value of the independently variable quantity, the various indicators being calibrated in terms of the various input or output quantities, and one of the indicators may conveniently be calibrated in terms of the independently variable quantity. Where it is desirable to effect variation in the proportions of such input and output quantities, in order to obtain operation at maximum efficiency when the quality or properties of the quantities may vary, one or more of such indicators may be provided with adjusting means to vary the amount of the movement of their pointers for a given variation in the independently variable quantity, and such adjusting means may be calibrated in arbitrary units, or in terms of the properties or qualities of the quantities concerned, or in terms of the ratio to other input or output quantities. It is preferred to utilize mechanism whereby variations of the independently variable quantity primarily causes changes in the resistance or other characteristic of an electrical circuit, the indicators then being electrical instruments, and the said adjusting means may then take the form of a rheostat or other variable electrical element in circuit with one or more of the indicators, and arranged to alter suitably the reading thereof.

The invention, as applied to indicate the quantities required for the correct operation of boilers, is exemplified in the accompanying drawings, whereof Fig. 1 represents an indicator for use with a mechanical stoker and calibrated in terms of the thickness of the fuel bed for various stoker speeds; and Fig. 2 represents a plurality of indicators for the more complete indication of the quantities required to be input to a boiler, involving the use of calibrated adjusting means for varying the indications.

In Fig. 1 the numeral 1 shows an indicating instrument having a pointer 2 which is operated by a suitable means according to the steam output of the boiler. The instrument has a series of concentric calibrations 3, each calibration being in terms of the thickness of the fuel bed, for the various speeds of the stoker, so that the pointer 2 shows for any steam output the depth of fuel required with each stoker speed to maintain correct operation. As the stand-by losses in the boiler involve a consumption of fuel at no load, the zero of the calibration will in general be suppressed as shown. In the case of pulverized fuel firing the multiple calibration is not necessary, and a single calibration may be made in terms of the speed of the conveyer or other mechanism determining the rate at which fuel is fed to the furnace.

In Fig. 2 a rheostat or equivalent current carrying device 4 is operated by flow metering mechanism 13 so as to produce variations in the current in an electrical circuit according to variations of the steam flow. The current circuit is shown by thick lines, and is supplied from a source of E. M. F. 5. The current passes through three indicating intruments 6, 7 and 8 marked "Coal", "Draught" and "Steam" respectively. The instruments are preferably of the voltage controlled type, wherein the indication depends on the ratio of the current in the current coils to the current in potential coils connected across the source of E. M. F. In the diagram the potential circuits are shown by thin lines. The indicator 6 marked "Coal" may be calibrated similarly to the indicator described with reference to Fig. 1, and a rheostat 9 is provided in its potential circuit whereby the reading may be altered in a constant ratio. The rheostat 9 may be provided with a scale 10 calibrated in terms of the calorific value of the fuel, or other convenient or arbitrary units. The indicator 7 marked "Draught" is calibrated in terms of draught, and indicates the draught which should be registered by a suitably connected draught gage to maintain combustion at the required rate. Thus the boiler dampers should be adjusted until the draught gauge registers in accordance with the indicator 7.

A rheostat 11 is provided in the potential circuit whereby the reading may be altered in a constant ratio, and the rheostat adjustment may be provided with a scale 12 calibrated in terms of the percentage of excess air over that theoretically required for combustion, or other convenient or arbitrary units. The indicator 8 shows the flow of steam, and, unlike the other indicators, shows the conditions actually occurring and not the condition which should be made to occur in order to maintain efficient operating conditions. The pointer has been described as the movable member cooperating with a stationary scale, but it is obvious that the scale could be arranged to move or rotate to co-operate with a stationary pointer.

The flow metering mechanism for imparting the desired movement to the contact 14 may be of any conventional design and since the details of this mechanism form no part of the present invention, only the casing thereof is indicated with fluid inlet and outlet orifices 15 and 16.

While the foregoing description has been chiefly with reference to the combustion process in steam boilers, it is evident that the invention may be applied to a wide range of chemical or physical processes without departing from its spirit or scope.

Having now particularly described and ascertained the nature of the said invention and in what manner the same is to be performed, I declare that what I claim is:—

1. Means for indicating quantities required for the correct operation of continuous processes in which an input quantity depends upon the values of an independently variable or controlling quantity, comprising in combination, an electrical indicator having voltage-current coils and a scale calibrated in terms of the required values of said input quantity corresponding to the values of said variable quantity, a pointer cooperating with the scale, means comprising a circuit having the voltage coil and a voltage controlling means connected therein for varying the amount of movement of the pointer, a second indicator having its voltage coil in an independent circuit, voltage controlling means in said latter circuit, and an electrical circuit connecting the current coils of the indicators in series and having means for controlling the current in said last named circuit in accordance with said independently variable quantity.

2. Means for indicating input quantities required for the generation of steam from a boiler comprising, in combination, an indicator having a scale calibrated in terms of the required values of fuel input corresponding to the values of steam output from said boiler, said indicator having voltage-current coils, a pointer cooperating therewith means comprising a circuit having the voltage coil and a voltage control means connected therein for varying the amount of movement of the pointer, a second indicator calibrated in terms of the required values of draught corresponding to the said values of steam output, and having its voltage coil in an independent circuit, voltage-controlling means in the latter circuit, a pointer for said latter indicator an electrical circuit connecting the current coils of the indicators in series, and means in said circuit for controlling the current in the last named circuit in accordance with the values of steam output.

In testimony whereof I have signed my name to this specification on this first day of October, A. D. 1928.

GEORGE WILLIAM BOST.